United States Patent
Deal et al.

(10) Patent No.: US 9,362,757 B2
(45) Date of Patent: Jun. 7, 2016

(54) SOLID-STATE ACTIVE SWITCH MATRIX FOR HIGH ENERGY, MODERATE POWER BATTERY SYSTEMS

(71) Applicant: Seeo, Inc, Hayward, CA (US)

(72) Inventors: Larry Deal, Shelby Township, MI (US); Peter Paris, San Diego, CA (US); Changqing Ye, Carlsbad, CA (US)

(73) Assignee: Seeo, Inc., Hayward, CA (US)

( * ) Notice: Subject to any disclaimer, the term of this patent is extended or adjusted under 35 U.S.C. 154(b) by 0 days.

(21) Appl. No.: 14/023,394

(22) Filed: Sep. 10, 2013

(65) Prior Publication Data

US 2014/0184161 A1    Jul. 3, 2014

Related U.S. Application Data

(63) Continuation-in-part of application No. 13/918,815, filed on Jun. 14, 2013, now abandoned.

(60) Provisional application No. 61/748,033, filed on Dec. 31, 2012.

(51) Int. Cl.
    *H02J 7/00*    (2006.01)
(52) U.S. Cl.
    CPC ............ *H02J 7/0014* (2013.01); *H02J 7/0019* (2013.01)
(58) Field of Classification Search
    USPC ........................................................ 320/121
    See application file for complete search history.

(56) References Cited

U.S. PATENT DOCUMENTS

| | | | |
|---|---|---|---|
| 8,089,249 B2 | 1/2012 | Zhang | |
| 8,288,992 B2 * | 10/2012 | Kramer et al. | 320/119 |
| 2009/0174369 A1 | 7/2009 | Kawahara | |
| 2011/0006736 A1 | 1/2011 | Robinson | |
| 2011/0121645 A1 | 5/2011 | Zhang | |
| 2013/0162214 A1* | 6/2013 | Liao et al. | 320/121 |
| 2013/0221919 A1 | 8/2013 | Gallegos | |

FOREIGN PATENT DOCUMENTS

| | | |
|---|---|---|
| CN | 101764421 A | 6/2010 |
| WO | 2009/111478 A2 | 9/2009 |
| WO | 2011069162 A1 | 6/2011 |

OTHER PUBLICATIONS

Google machine translation of CN101764421.
M. Chen, G. A. Rincon-Mora, Accurate Electrical Battery Model Capable of Predicting Runtime and I-V Performance, IEE Transactions on Energy Conversion, vol. 21, No. 2, 2006.
M. Knauff, J. McLaughlin, C. Dafis, D. Niebur, P. Singh, H. Kwatny, C. Nwankpa, Simulink Model of a Lithium-Ion Battery for the Hybrid Power System Testbed, IEEE Electric Ship Technologies Symposium, 2007.
P. Spagnol, S. Rossi, S.M. Savaresi, "Kalman Filter SoC estimation for Li-Ion batteries," 2011 IEEE International Conference on Control Applications (CCA), Part of 2011 IEEE Multi-Conference on Systems and Control, Denver, CO, USA. Sep. 28-30, 2011, p. 587.
S. Mullin, G. Stone, A. Panday, N. Balsara, Salt Diffusion Coefficients in Block Copolymer Electrolytes, J. Electrochem. Soc., 158(6) A619-A627, 2011.

* cited by examiner

*Primary Examiner* — Eric Lee
(74) *Attorney, Agent, or Firm* — R'Sue Popowich Caron

(57) ABSTRACT

A battery management system employs electronic switches and capacitors. No traditional cell-balancing resistors are used. The BMS electronically switches individual cells into and out of a module of cells in order to use the maximum amount of energy available in each cell and to completely charge and discharge each cell without overcharging or under-discharging.

8 Claims, 5 Drawing Sheets

SOLID-STATE ACTIVE SWITCH MATRIX FOR HIGH ENERGY, MODERATE POWER BATTERY SYSTEMS

CROSS-REFERENCE TO RELATED APPLICATIONS

This application is a continuation in part of copending U.S. patent application Ser. No. 13/918,815, filed Jun. 14, 2013 and also claims priority to U.S. Provisional Patent Application 61/748,033, filed Dec. 31, 2012, both of which are incorporated by reference herein.

STATEMENT OF GOVERNMENT SUPPORT

The invention described and claimed herein was made in part utilizing funds supplied by the U.S. Department of Energy under Contract No. DE-OE0000223. The Government has certain rights in this invention.

BACKGROUND OF THE INVENTION

Field of the Invention

This invention relates generally to control systems for battery packs, and, more specifically, to advanced battery pack control systems with increased efficiency and reduced energy losses as compared to conventional systems.

A battery management system (BMS) is a computer system that can monitor the state of a battery pack through various parameters, such as total voltage, voltages of individual cells, temperature, state of charge (SOC) or depth of discharge (DOD) of individual cells and the overall battery pack, and the current flow into and out of the battery. A BMS can also control recharging of a battery pack by directing charge to optimize charging of each cell. A BMS can protect a battery pack by ensuring that it is operating within safe operating parameters. Operating parameters to be avoided include, but are not limited to: over-current, over-voltage (during charging), and under-voltage (during discharging). A good BMS can improve battery life, safety, and scalability, and can also decrease charge times.

A BMS can prevent a battery from operating outside its safe operating parameters, for example, by including an internal switch that opens and thereby deactivates the battery if the battery is moving into unsafe operating conditions.

Typically, individual cells in a battery have somewhat varied capacities and may be at different levels of state of charge (SOC) at any given time. In general, discharging stops when the cell with the lowest capacity is depleted (even though other cells are still not depleted), thus limiting the energy that can be taken from and returned to the battery.

Thus, the cell of lowest capacity is a "weak point," and it can easily be overcharged or over-discharged while cells with higher capacity undergo only partial cycling. But if the battery can be balanced, both the cell with the largest capacity and the cell with the lowest capacity can be fully charged without any undercharging or overcharging. Similarly, both the cell with the largest capacity and the cell with the lowest capacity can be fully discharged without any under-discharging over-discharging. For higher capacity cells to undergo full discharge cycles of the largest amplitude, a balancer transfers charge to the lower capacity cells in order to maintain a safe operating condition for those cells.

Balancing can be done either actively or passively. In active balancing, charge is drawn from the most charged cells and transferred to the least charged cells, usually through DC-DC converters. DC-DC converters require complex circuitry resulting in increased cost and a reduction in robustness. In passive balancing, energy is drawn from the most charged cell and is wasted as heat, usually through regulators such as resistors.

Simple passive regulators achieve balancing across cells by bypassing charging current when a cell's voltage reaches a certain level. But cell voltage is a poor indicator of a cell's SOC, and, for certain lithium chemistries such as $LiFePO_4$, it is no indicator at all. Thus, making cell voltages equal using passive regulators does not balance SOC, which is the goal of a BMS. Therefore, while providing some benefit in particular cases, such devices have severe limitations in their effectiveness overall.

Active regulators intelligently turn a load on and off when appropriate, again to achieve balancing. Yet, if only the cell voltage is used as a parameter to enable the active regulation, the same constraints noted above for passive regulators apply.

Even when only a single cell is damaged, traditional battery packs are considered to be no longer usable. Ignoring such a damaged cell in a traditional pack can lead to unsafe conditions including cell leaking and thermal excursions, and may cause damage to peripheral devices, both internal to the pack, such as monitoring electronics, and external to the pack, such as inverters, DC/DC converters and other high voltage accessories.

What is needed is a way to optimize battery performance and safety without wasting valuable energy so that the full energy of a battery pack can be used for the entire life of its cells.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1:
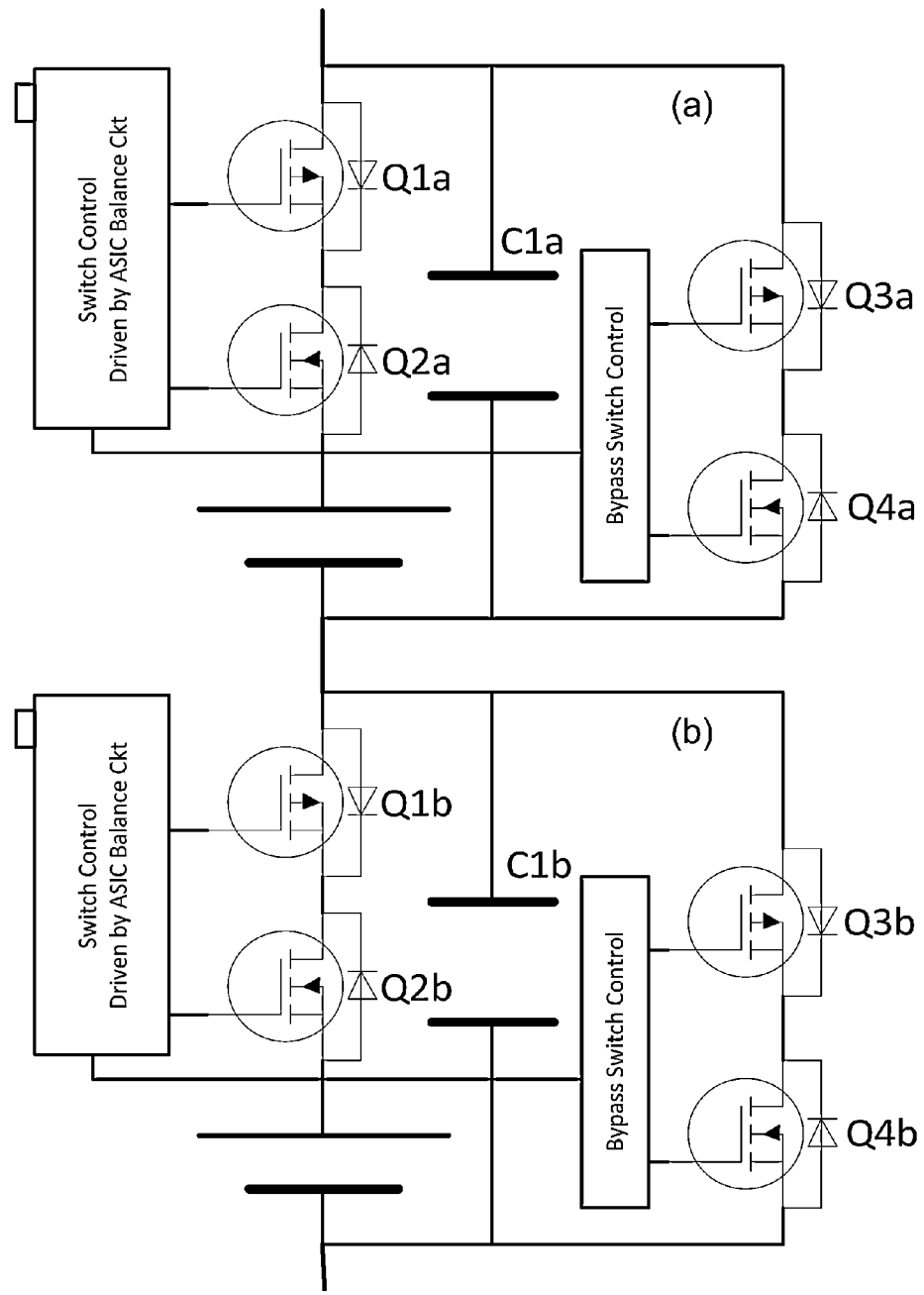
FIG. 1 is a wiring diagram that shows a battery management system, according to an embodiment of the invention

In one embodiment of the invention, a novel, new battery module is disclosed. The module has a plurality of cells connected to one another electrically; a plurality of sensors configured to measure properties of the cells and of the battery module; and an electronic switch assembly associated with each cell. The switch assembly is configured to remove its associated cell from service when directed to by a BMS. The electronic switch assembly is further configured to establish direct electrical connection between cells adjacent to the removed cell. In one arrangement, the electronic switch assembly comprises transistors and a capacitor. In another arrangement, the electronic switch assembly comprises four MOSFETs and a capacitor. The four MOSFETs may be arranged in two sets of two MOSFETS connected in series with the two sets connected in parallel. In one arrangement, the electronic switch assembly further includes a capacitor configured to maintain battery module operation while a cell is removed from service and the direct electrical connection between adjacent cells is established.

In another embodiment of the invention, a battery pack is disclosed. The battery pack has a battery management system (BMS); a plurality of modules, each of which comprises a plurality of battery cells connected to one another electrically; and an electronic switch assembly associated with each battery cell. The electronic switch assembly is configured to remove its associated cell from service when instructed to do so by the BMS. The electronic switch assembly is configured to establish direct electrical connection between cells adjacent to the removed cell.

In another embodiment of the invention a battery pack is disclosed. The pack has one or more modules wherein each comprises a plurality of cells; an electronic switch assembly associated with each cell, the electronic switch assembly configured to remove its associated cell from service while establishing direct electrical connections between cells adjacent to the removed cell; sensors associated with each module, wherein the sensors are configured to measure at least individual cell voltage, module voltage, and module temperature; a logic device to apply an algorithm to the sensor data in order to make decisions as to removing any cells from service; and a communication path to send the decisions to the electronic switch assemblies.

In yet another embodiment of the invention, a method of managing a battery pack is disclosed. The method involves providing one or more modules wherein each comprises a plurality of cells; providing an electronic switch assembly associated with each cell; and providing sensors associated with each module. The sensors are configured to measure and provide data for at least individual cell voltages, module voltage, and module temperature. The method further involves applying an algorithm to the data in order to make decisions as to removing any cells from service and communicating the decisions to the electronic switch assemblies. In one arrangement, applying the algorithm involves determining values for an overall cell voltage, a resistance of each cell, a SOC of each cell and a SOC of each module; comparing one or more of the values to predetermined threshold values to determine which of the values is unacceptable; and deciding whether to remove cells from service or to remove modules from service or to shut down the battery pack based on the unacceptable values.

DETAILED DESCRIPTION

The aforementioned needs are satisfied by the embodiments of the present invention which are directed to a novel battery management system that employs electronic devices to monitor and manage individual cells in high energy, medium power batteries. This results in a reduction in energy losses during both charge and discharge by eliminating balancing resistors and fully utilizing the energy available in each cell.

These and other objects and advantages of the present invention will become more fully apparent from the following description taken in conjunction with the accompanying drawings.

As used herein, the term "remove from module" is used to mean breaking electrical connection so that the removed cell does not participate in the activity (i.e., charging or discharging) of the module. Such removal may be reversed as battery conditions allow.

In one embodiment of the invention, the battery management system employs electronic switches and capacitors. No traditional cell-balancing resistors are used. The BMS electronically switches individual cells into and out of a module of cells in order to use the maximum amount of energy available in each cell and to completely charge and discharge each cell without overcharging or under-discharging. A simplified battery module arrangement includes a single array of cells in series with electronic switches that can either include or bypass each cell as desired. In a more complex arrangement, multiple cells are connected in parallel, but there is still an array of switches that controls connections and disconnections of each set of parallel cells. This not only ensures that the full energy available from the pack is used, but also eliminates the power loss associated with balancing the cells using traditional methods. In addition to efficiency gain, such a BMS also provides the benefits of greater safety and reliability as it has the ability to bypass cells that are damaged, thus preventing premature shutdown of the pack.

In one embodiment of the invention, the battery controller (BMS) can bypass any cell or combination of cells in the battery module. Thus individual cells that are at the highest state of charge (SOC) can be bypassed during charging, and individual cells of the lowest SOC can be bypassed during discharge. That is to say that during charging, some cells may become totally charged (have the highest SOC) before others. When such cells are bypassed, charging can continue until all cells are fully charged without the risk of overcharging any of them. Once charging is complete, bypassed cells may be returned to active service in the module, available for discharging. Similarly, during discharging, some cells may become totally discharged (have the lowest SOC) before others. When such cells are bypassed, discharging can continue until all cells are fully discharged without the risk of over-discharging any of them. Once discharging is complete, bypassed cells may be returned to active service in the module, available for charging. If it is found that one or more bypassed cells is defective, such cell(s) may not be returned to service.

The wiring diagram in FIG. 1 shows a series of cells a, b with their associated electronic switches and capacitors. An individual cell x is bypassed by switching off an electronic switch bank $Q1_x/Q2_x$ and switching on an electronic switch bank $Q3_x/Q4_x$. The length of time between turning off the bank $Q1_x/Q2_x$ and turning on the bank $Q3_x/Q4_x$ is critical. Capacitor $C1_x$ is charged and maintains battery pack operation during the transient switching operation.

Until now it has been necessary to shut down a battery pack and physically switch out individual cells as they fail. With the novel BMS disclosed herein, it is now possible to switch individual cells into and out of system dynamically as the pack continues to provide energy. The new BMS allows faster, more efficient balancing of cells, increasing pack round trip efficiency and decreasing charge times. The BMS also increases reliability and safety of battery packs by allowing defective cells to be safely bypassed until module servicing can occur. The BMS also makes it possible to ease performance standards for individual cells, thus increasing cell manufacturing yield, as there is increased tolerance for capacity variation knowing that poorly performing cells can be bypassed seamlessly without shutting down the pack.

Battery packs that employ the BMS described herein can be used, for example, in applications such as electric and hybrid electric vehicles, stationary power storage, portable electronic devices, and UPS (uninterruptible power supply) systems to name a few.

Figure 2:
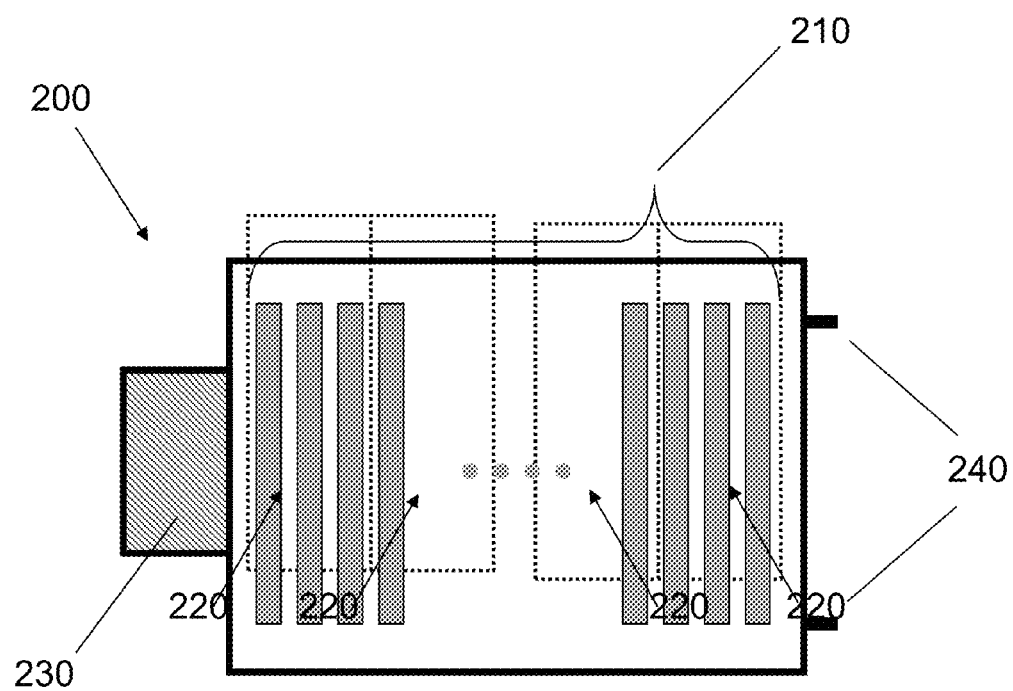
FIG. 2 is a schematic illustration of the basic components in a rechargeable battery pack.

A schematic illustration of the basic components in a rechargeable battery pack is shown in FIG. 2. A battery pack 200 includes many individual rechargeable cells 210. There is no particular limit to the number of cells the battery pack 200 can have, but generally, with current technologies, battery packs have between about tens of cells and several thousand cells. There is no limit to the kinds of cells 210 such a pack 200 can include. Examples of possible cell chemistries include, but are not limited to, lithium metal, lithium ion, nickel-cadmium (NiCd), nickel-zinc (NiZn), nickel metal hydride (NiMH), nickel-zinc (NiZn), and lead-acid chemistries. Most often the cells 210 are identical to one another, although battery packs that include more than one kind of cell are also possible.

As shown in FIG. 2, a group of cells 210 can be arranged into one or more modules 220, and groups of modules 220 can be arranged to form the pack 200. The pack 200 has a BMS (battery management system) 230 that is in electrical communication with various components of the pack 200. The pack 200 also has terminals 240 that can be connected to an outside load. The BMS 230 may also be in electrical communication with the terminals 240. Pack monitoring can occur at the cell level, at the module level and at the pack level.

Figure 3:
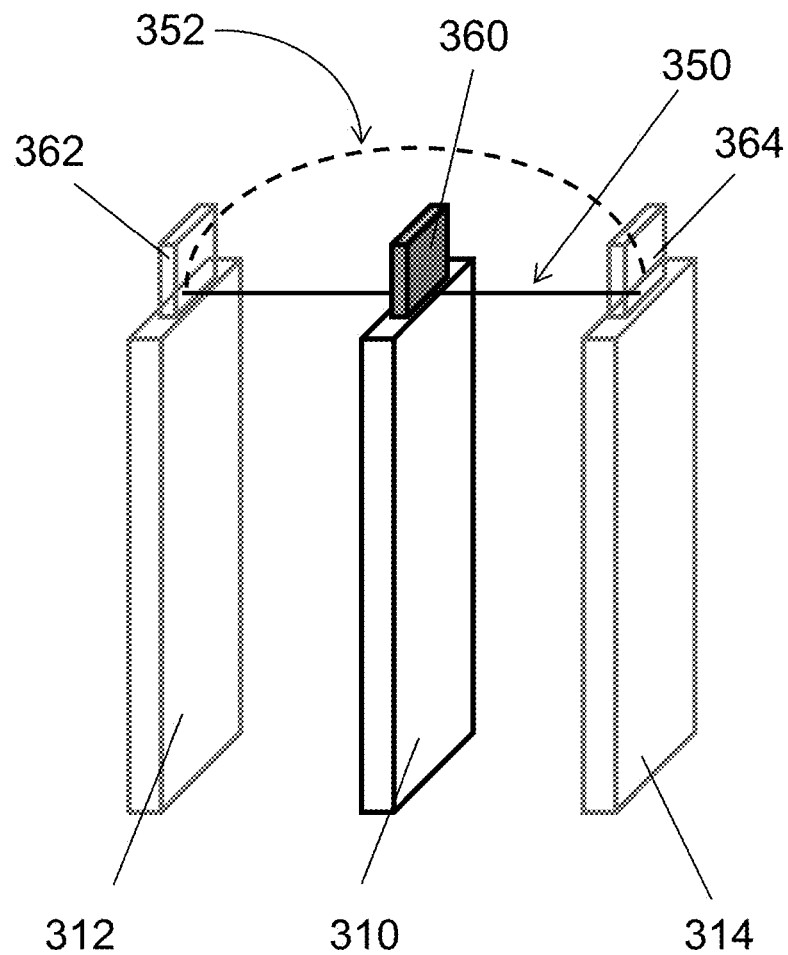
FIG. 3 is a schematic illustration that shows a cell and its associated switch assembly as it is connected to adjacent cells, according to an embodiment of the invention.

FIG. 3 is a schematic illustration that shows a cell 310 that is connected to adjacent cells 312, 314 through electrical connection 350, according to an embodiment of the invention. Although FIG. 3 shows the cell 310 connected in series to the cells 312, 314, other arrangements, such as parallel connections are possible. Each of the cells 310, 312, 314 has a switch assembly 360, 362, 364, respectively, associated with it. In one arrangement, each switch assembly 360, 362, 364 contains at least four electronic switches and a capacitor (not shown).

The switch assembly contains two sets of two electronic switches: a removing set and a bypassing set. In each set, the two electronic switches are connected in series to prevent current from flowing in either direction when the electronic switches are off. If there were only one electronic switch, it would still be possible for the current to flow in one direction.

The removing set of two electronic switches is used to remove the associated cell from the module. In the removing set, one electronic switch is configured to remove the cell from the module for discharge purposes, but the same electronic switch cannot remove the cell during charging. The second electronic switch is used to remove the cell from the module for charge purposes. The bypassing set of two electronic switches is connected in parallel to the removing set and is used to establish a path direct through which current can flow past the removed cell.

The capacitor in the switch assembly is charged and maintains battery pack operation during the transient switching operation.

Each switch assembly is configured to receive instructions from the BMS. In one arrangement, the instructions direct the switch to keep its associated cell active or to take it offline and bypass its associated cell.

Figure 4:
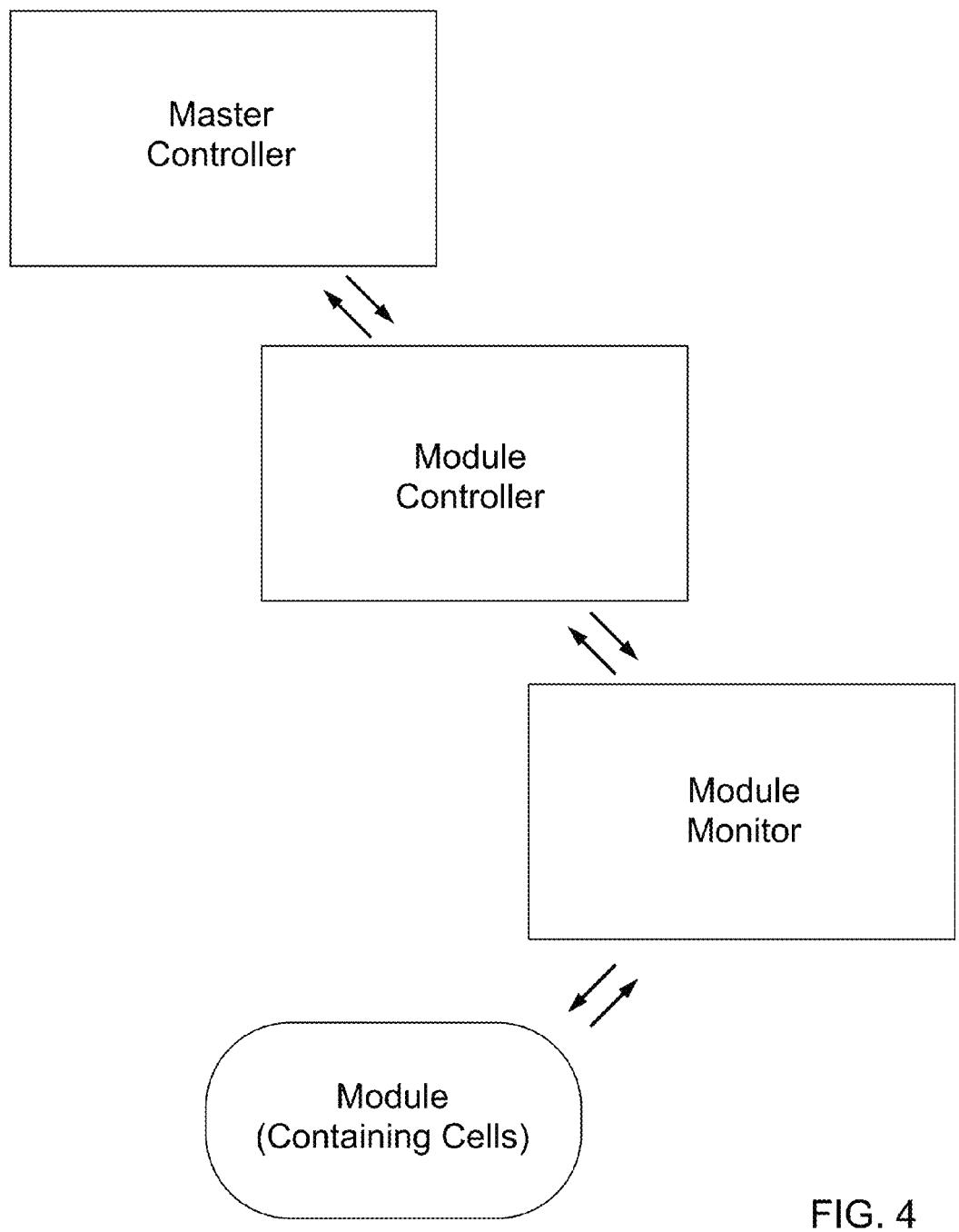
FIG. 4 is a schematic illustration that shows three main components of a BMS (computer system), according to an embodiment of the invention.

In one embodiment of the invention, a BMS can be thought of as having three main components, as shown in FIG. 4.

1) Module Monitor
   includes various sensors;
   has direct interface with battery modules and cells therein to measure parameters such as temperature (at any number of places within the module), individual cell voltages, overall module voltage, and current;
   communicates with both the switches associated with the cells and with higher levels in the BMS;
2) Module Controller
   receives data from the Module Monitor
   may process data to put it in a form that can be used by the Master Controller (e.g., removing noise, averaging, calibration, and normalization of units);
   sends processed data to the Master Controller and
   receives instructions from the Master Controller sends them on to the Module Monitor;
3) Master Controller
   receives and processes information from the Module Controller;
   uses algorithm to determine whether to remove individual cells from service
   sends instructions to the Module Controller;

In other arrangements, the functions of the BMS may be distributed among more or fewer components than discussed above.

The master controller is responsible for SOC/SOH calculations, communication with the external load, and ultimate control of the battery pack. For example, the master controller may shut down the entire battery pack if the overall temperature is too high.

With reference to the diagram in FIG. 4 and the battery cells shown in FIG. 3, if the Master Controller determines that the cell 310 should be removed from service, it sends instructions to switch assembly 360 directing it to break the electrical connection 350 that connects the cell 310 with the adjacent cells 312, 314 in order to remove the cell 310 from service. The switch assembly 360 also bypasses the cell 310 by establishing a direct connection 352 between the cells 312 and 314.

The algorithm used by the Master Controller considers various factors in determining whether to remove a cell from service. Among the factors that can be considered include cell voltage, module voltage, current, and temperature. For example, consider a battery module with many cells, each of which is nominally rated for 10 Ah. During discharge, a weak cell reaches full discharge at only 9 Ah. Ordinarily such a module would shut down altogether to protect the weak cell from over-discharge. But, by using the new and novel methods and apparatus described herein, the weak cell can be bypassed while electrical connections between adjacent cells are maintained, thus allowing the other cells in the module to continue to full discharge without damaging the weak cell.

In general, electronic switches that are designed to operate under low current and low power conditions and are inexpensive are well-suited for the embodiments of the invention, as disclosed herein. In one arrangement, the electronic switch is a transistor. In another arrangement, the electronic switch is a MOSFET, such as p-channel or n-channel MOSFETs. In other arrangements, the electronic switch is an IGBT (insulated-gate bipolar transistor), a solid state relay, or other such electronic switch as would be known by a person of ordinary skill in the art. In another embodiment of the invention, the electronic switches are tailored specifically for this application in order to maximum efficiency and robustness. MOSFETs may be especially well-suited as they are very inexpensive and can be bought off the shelf. For battery packs that produce low current and low power, the addition of such switches to monitor individual cells is very cost effective. The cost of supplying such switches for each cell is more than offset by the efficiencies realized by discharging each cell fully with no danger of over-discharge.

At present using electronic switches at the cell level for high power applications may not be cost effective as the cost of switches designed to operate under high power conditions is relatively high. For example, a battery pack that contains 96 cells, has a nominal voltage of 328V, and can supply 32.8 kW of power would be supplying 100 Amps of current. If high-performance MOSFETs are used to switch cells in and out of the module, the nominal resistance for each cell to cell connection increases by about 0.002 ohms in series, resulting in 20 W of additional power loss at each cell to cell connection in the pack. The total additional power loss is about 1.92 kW, or almost 6% of the total power of the pack. Such a power loss may not be acceptable for many applications. If the same pack supplied only 3.28 kW of power, it would be supplying only 10 Amps of current. Total power loss would drop to about 0.2 W/cell or about 19.2 W for the pack, less than 1% of the total power of the pack. Such a loss may be acceptable for most applications.

In the future, if the resistance (and cost) of high power electronic switches goes down, it would make sense to employ the embodiments of the invention for high power applications.

In one embodiment of the invention, cells in a battery pack that uses the methods and apparatus disclosed herein discharge at a rate at or less than about 0.75 C. In another embodiment of the invention, cells in a battery pack that uses the methods and apparatus disclosed herein discharge at a rate at or less than about 1 C.

Figure 5:
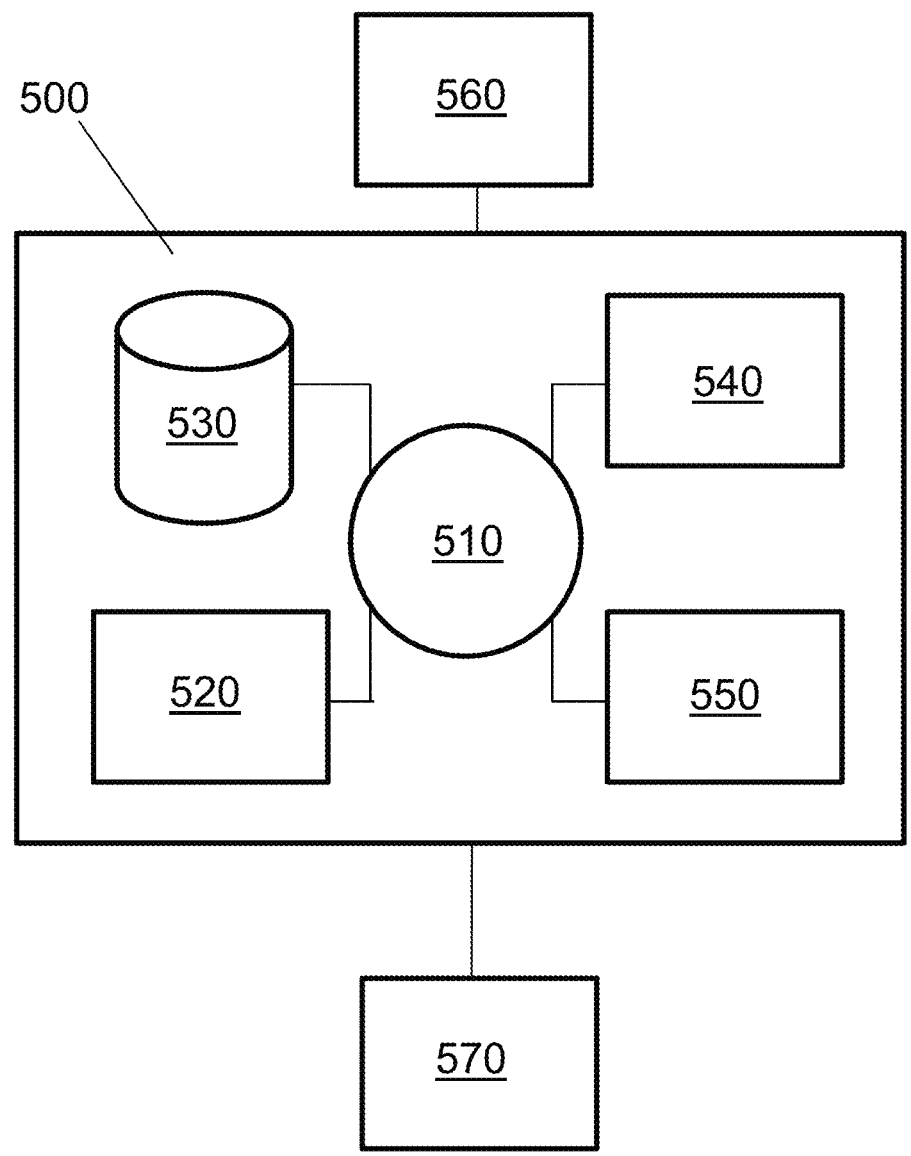
FIG. 5 shows a computer system (BMS) that is programmed or otherwise configured to remove cells or modules from service or to shut down a battery pack based on various measured parameters.

Methods of the present disclosure, including applications of algorithms for determining whether to remove one or more individual cells from service, can be implemented with the aid of a computer system. FIG. 5 is a schematic drawing that shows a computer system 500 that is programmed or otherwise configured to determine whether to remove one or more individual cells from service. The system 500 includes a central processing unit (CPU, also "processor" and "computer processor" herein) 510, which can be a single core or multi core processor, or a plurality of processors for parallel processing. The system 500 also includes computer memory 520 (e.g., random-access memory, read-only memory, flash memory), electronic data storage unit 530 (e.g., hard disk), communication interface 540 (e.g., network adapter) for communicating with one or more other systems and/or components (e.g., batteries), and peripheral devices 550, such as cache, other memory, data storage and/or electronic display adapters. The memory (or memory location) 520, storage unit 530, interface 540 and peripheral devices 550 are in communication with the CPU 510 through a communication bus (solid lines), such as a motherboard. The storage unit 530 can be a data storage unit (or data repository) for storing data.

In some situations, the computer system 500 includes a single computer system. In other situations, the computer system 500 includes multiple computer systems in communication with one another, such as by direct connection or through an intranet and/or the Internet.

Methods as described herein can be implemented by way of machine (or computer processor) executable code (or software) stored on an electronic storage location of the system 500, such as, for example, on the memory 520 or electronic storage unit 530. During use, the code can be executed by the processor 510. In some cases, the code can be retrieved from the storage unit 530 and stored on the memory 520 for ready access by the processor 510. As an alternative, the electronic storage unit 530 can be precluded, and machine-executable instructions can be stored in memory 520. The code can be pre-compiled and configured for use with a machine have a processor adapted to execute the code, or can be compiled during runtime. The code can be supplied in a programming language that can be selected to enable the code to execute in a pre-compiled or as-compiled fashion.

The system 500 can include or be coupled to an electronic display 560 for displaying whether any cells have been removed from service, and optionally which cells have been removed. The electronic display can be configured to provide a user interface for providing information about how many cells have been removed from service. An example of a user interface is a graphical user interface. As an alternative, the system 500 can include or be coupled to an indicator for providing information about how many cells have been removed from service, such as a visual indicator. A visual indicator can include a lighting device or a plurality of lighting devices, such as a light emitting diode, or other visual indicator that displays information about how many cells have been removed from service (e.g., 10%, 20%, 30%, 40%, 50%, 60%, 70%, 80%, or 90% of the total number of cells). Another example of an indicator is an audible indicator or a combination of visual and audible indicators.

The system 500 can be coupled to one or more battery packs 570. The system 500 can execute machine executable code to implement any of the methods provided herein for determining whether to remove one or more individual cells from service in the one or more battery packs 570.

Aspects of the methods and systems provided herein, such as methods for determining whether to remove one or more individual cells from service, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution. This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A battery module comprising:
a plurality of cells connected to one another electrically;
a plurality of sensors configured to measure properties of the cells and of the battery module; and
a separate electronic switch assembly associated with each cell, each separate electronic switch assembly comprising transistors and a capacitor;
wherein each separate switch assembly is configured to remove its associated cell from service when directed to by a computer system;
wherein each separate electronic switch assembly is configured to establish direct electrical connection between cells adjacent to the removed cell; and
wherein the capacitor is configured to maintain battery module operation while its cell is removed from service and a direct electrical connection between adjacent cells is established.

2. The module of claim 1 wherein each separate electronic switch assembly comprises four MOSFETs and a capacitor.

3. The module of claim 2 wherein the four MOSFETs are arranged in two sets of two MOSFETS connected in series and the two sets are connected in parallel.

4. A battery pack comprising:
a computer system;
a plurality of modules, each of which comprises a plurality of battery cells connected to one another electrically; and
a separate ectronic switch assembly associated with each battery cell, each separate electronic switch assembly comprising transistors and a capacitor;
wherein each separate electronic switch assembly is configured to remove its associated cell from service when instructed by the computer system; and
wherein the capacitor is configured to maintain battery module operation while its cell is removed from service and a direct electrical connection between adjacent cells is established.

5. A method of managing a battery pack comprising:
providing one or more modules wherein each comprises a plurality of cells;
providing a separate electronic switch assembly associated with each cell, wherein:
each separate electronic switch assembly comprises transistors and a capacitor;
wherein each separate electronic switch assembly is configured to remove its associated cell from service; and
the capacitor is configured to maintain battery module operation while its cell is removed from service and a direct electrical connection between adjacent cells is established;
providing sensors associated with each module, wherein the sensors are configured to measure and store data in a memory location for at least individual cell voltages, module voltage, and module temperature;
applying an algorithm to the stored data using a computer processor in order to make decisions about whether to remove any cells from service; and
using a communication interface to communicate the decisions to each separate electronic switch assembly.

6. The method of claim 5 wherein applying the algorithm comprises:
determining values for an overall cell voltage, a resistance of each cell, a SOC of each cell and a SOC of each module and storing the values in a memory location;
comparing one or more of the values to predetermined threshold values to determine which of the values is unacceptable;
deciding whether to remove cells from service or to remove modules from service or to shut down the battery pack based on the unacceptable values.

7. A battery pack comprising:
one or more modules wherein each comprises a plurality of cells;
a separate electronic switch assembly associated with each cell, wherein:
each separate electronic switch assembly comprises transistors and a capacitor;
each separate electronic switch assembly is configured to remove its associated cell from service; and
the capacitor is configured to maintain battery module operation while its cell is removed from service and a direct electrical connection between adjacent cells is established;
a memory location;
sensors associated with each module, wherein the sensors are configured to gather data on at least individual cell voltage, module voltage, and module temperature and to store the data in the memory location;
a computer processor to apply an algorithm to the sensor data in order to make decisions as to removing any cells from service; and
a communication interface to send the decisions to each separate electronic switch assemblies.

8. A computer-readable medium comprising code which, upon execution by a computer processor implements a method, the method comprising:
measuring at least individual cell voltage, module voltage, and module temperature while a battery pack is operating;
recording in a memory location the individual cell voltage, module voltage, and module temperature;
comparing, using a computer processor, one or more of the values of individual cell voltage, module voltage, and module temperature values to predetermined threshold values to determine which of the values is unacceptable; and determining whether to remove cells from service or to remove modules from service or to shut down the battery pack based on the unacceptable values; and if it is determined to remove cell(s) from services, the further steps of:

sending instructions to the cell(s) wherein there is a separate electronic switch assembly associated with each cell;

each separate electronic switch assembly comprises transistors and a capacitor;

each separate electronic switch assembly is configured to remove its associated cell from service; and the capacitor is configured to maintain battery module operation while its cell is removed from service and a direct electrical connection between adjacent cells is established, and each separate electronic switch assembly is configured to remove its associated cell from service while establishing direct electrical connections between cells adjacent to the associated cell.

* * * * *